United States Patent [19]
Tanaka et al.

[11] Patent Number: 5,097,324
[45] Date of Patent: Mar. 17, 1992

[54] BEAM-INDEX COLOR DISPLAY UNIT

[75] Inventors: Satoru Tanaka; Fumio Matsui, both of Saitama, Japan

[73] Assignee: Pioneer Electronic Corporation, Tokyo, Japan

[21] Appl. No.: 542,749

[22] Filed: Jun. 25, 1990

[30] Foreign Application Priority Data

Jul. 3, 1989 [JP] Japan .................. 1-171725

[51] Int. Cl.$^5$ ............................ H04N 9/31
[52] U.S. Cl. ......................... 358/60; 358/56; 358/69; 340/795
[58] Field of Search ............... 358/56, 59, 60, 61, 358/62, 63, 230, 231, 66, 67, 68, 69; 340/799, 795

[56] References Cited

U.S. PATENT DOCUMENTS

| | | | |
|---|---|---|---|
| 3,634,614 | 1/1972 | Geusic | 358/56 |
| 4,635,106 | 1/1987 | Shinkai | 358/68 |
| 4,636,843 | 1/1987 | Hosono et al. | 358/67 |
| 4,684,996 | 8/1987 | Baumeister | 358/231 |
| 4,979,030 | 12/1990 | Murata | 358/56 |

FOREIGN PATENT DOCUMENTS 2118803 11/1983 United Kingdom ............ 358/56

Primary Examiner—James J. Groody
Assistant Examiner—Safet Metjahic
Attorney, Agent, or Firm—Fleit, Jacobson, Cohn, Price, Holman & Stern

[57] ABSTRACT

A beam index color display unit uses a single light beam scanning a two-dimensional screen of light beam sensitive three-color phosphor stripes arranged with regularity. The intensity of the light beam is modulated in response to information signals in a video signal while the scanning timing of the light beam is detected by light sensing devices disposed between each of phosphor stripes. Thus, images are displayed on the two-dimensional screen of the display unit.

1 Claim, 2 Drawing Sheets

ELECTRON BEAM

EXCITING LIGHT BEAM

HORIZONTAL SCANNING DIRECTION

BEAM-INDEX COLOR DISPLAY UNIT

BACKGROUND OF THE INVENTION

1. Field of the Invention

The present invention relates to a beam-index color display unit.

2. Description of Background Information

Beam-index type color display units are constructed that a two-dimensional screen consisting of three-color phosphor stripes of R (red), G (green), and B (blue), which are arranged with regularity in the horizontal direction, is scanned by a single beam. For this reason, it is necessary to apply a feedback system to detect the horizontal scanning position of the beam, so that the phosphor stripes are correctly excited.

An example of conventional beam-index color display units is shown in FIG. 1. As shown, a two-dimensional screen 33 is formed by horizontal stripes 31 of R, G, B arranged with regularity in the horizontal direction and black stripes 32 consisting of a black opaque material which is inserted between each horizontal stripe 31. Moreover, a metal back 34 of aluminum is formed on the whole area of the screen 33, and phosphor stripes 35 for indexing purpose are arranged in the horizontal direction so that the pitch of the phosphor stripes 35 is, for example, ⅔ of the interval of R, G, B sets of the phosphor stripes 31. When the phosphor stripes 31 are scanned by the single electron beam, the electron beam is incident on the phosphor stripes 35 to excite them, so that light is emitted from the phosphor stripes 35. The emitted light is detected by a light detector 36 to perform the feedback operation. This structure is disclosed in Japanese Patent Publication No. P61-61315.

Since prior art display units as mentioned above are of the beam-index type that uses an electron beam in an evacuated envelope (or a vacuum system), it has not proven possible to make the whole system lightweight. Moreover, adaptation of the picture size, especially change to a larger picture size, was not possible because of the fixed positional relation between the electron gun and the phosphor screen.

OBJECT AND SUMMARY OF THE INVENTION

An object of the present invention is therefore to provide a beam-index color display unit that can be made lightweight and which system can be easily adapted to be suitable for use in screens of different sizes.

In the beam-index color display unit according to the present invention, a two-dimensional screen consisting of stripes of light beam sensitive three-color light emitting elements arranged with regularity in a predetermined direction, is scanned by a single light beam in synchronicity with horizontal and vertical sync signals separated from a color video format signal. At the same time, the scanning light beam is sensed by a plurality of stripe form light sensing devices, each positioned between adjacent stripes of R, G, B three-color light emitting elements. The intensity of the light beam is modulated in response to the information signal in the color video signal in synchronicity with the timing of scanning in the predetermined direction, which is derived by using sensing outputs obtained by the sensing of the light beam.

DETAILED DESCRIPTION OF A PREFERRED EMBODIMENT

The embodiment of the beam-index color display unit according to the present invention will be described in detail with reference to the accompanying drawings.

Figure 1:
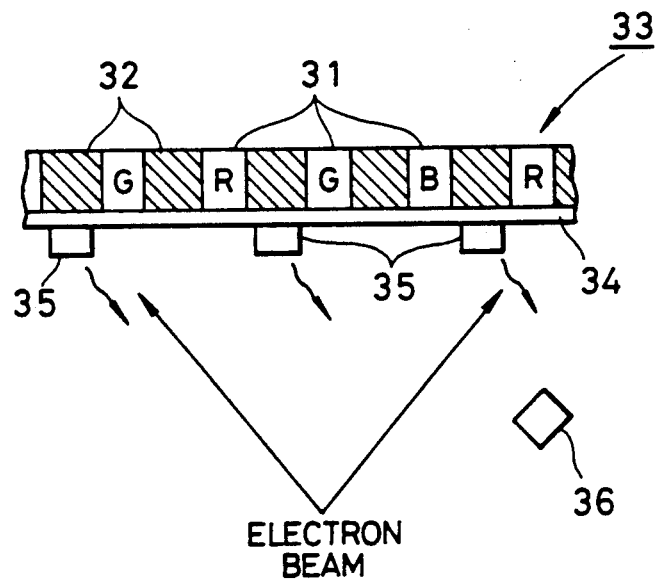
FIG. 1 is a plan view of a two-dimensional screen structure used in conventional display units with an evacuated envelope.
Figure 2:
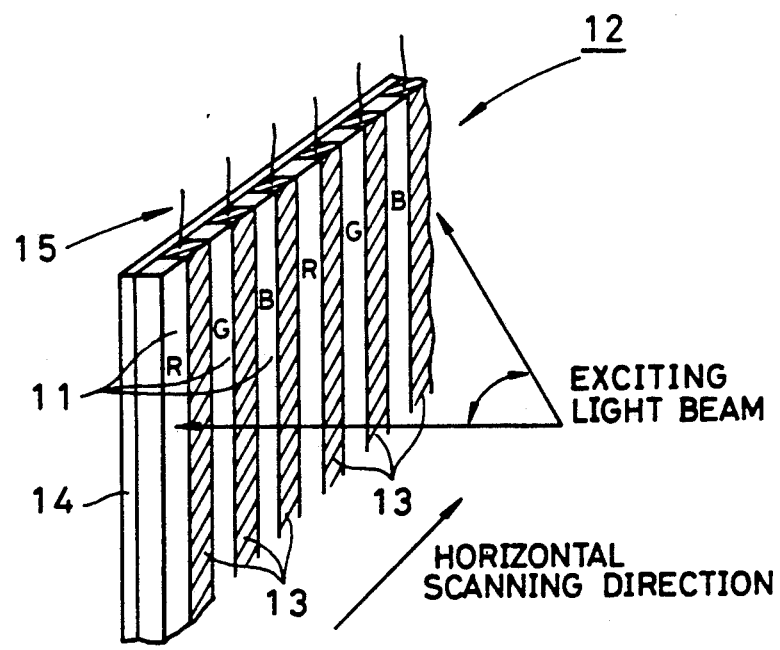
FIG. 2 is a schematic perspective view of an embodiment of the two-dimensional screen structure used in the beam-index color display unit according to the present invention.

In FIG. 2, stripes of R, G, B light emitting elements such as phosphor stripes 11, which are sensitive to an exciting light beam such as a beam of ultraviolet rays, are arranged with regularity in the direction of the horizontal scanning, to form a two-dimensional screen 12. A set of phosphor stripes including each one of colors R, G, B constitutes a unit picture element in the horizontal scanning direction. In this two-dimensional screen 12, a plurality of light sensing devices 13 of stripe form made of a photoelectric material such as CdS (Cadmium Sulfide) for sensing the exciting light beam are provided so that each light sensing device 13 is positioned between adjacent phosphor stripes 11. Back surfaces of the light sensing devices 13 with respect to the irradiation of the exciting light beam, i.e, surfaces facing a face plate 14, are covered with a black opaque material, to form a black stripe structure. A signal line 15 is connected to each of the plurality of light sensing devices, for deriving each sensing signal as an index signal. The index signals derived by the signal lines 15 is supplied to a position detection circuit 26 shown in FIG. 3.

Figure 3:
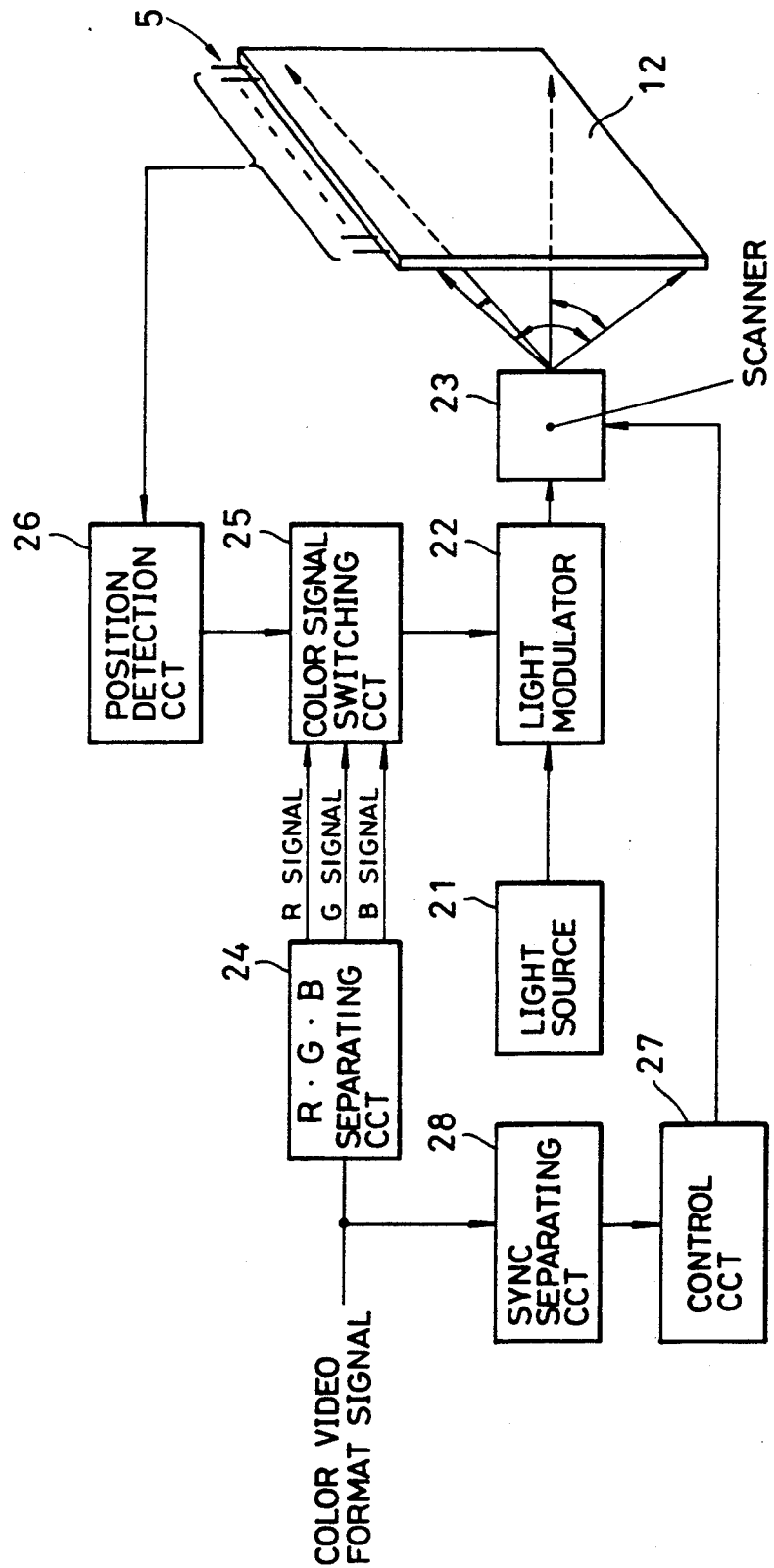
FIG. 3 is a structural diagram of the beam-index color display unit according to the present invention.

FIG. 3 shows the structure of the beam-index color display unit according to the present invention. As shown in the figure, the single exciting light beam such as the beam of ultraviolet rays is supplied by a light source 21, through a light modulator 22, to a scanner 23 as the scanning light beam. A set of R, G, B signals representing the color of a unit picture element is separated from the color video format signal at an R, G, B separating circuit 24, and is rearranged to a serial form at a color signal switching circuit 25, to form a time division color signal. The time division color signal is supplied to the light modulator 22 which modulates the intensity of the exciting light beam in response to the time division color signal. Timing control of the color signal switching circuit 25 is performed by a position detection circuit 26 detecting the horizontal scanning position of the light beam on the basis of the index signal from the plurality of light sensing devices in the two-dimensional screen 12. By this operation, the color signal switching circuit 25 converts the set of R, G, B signals representing the color of the unit picture element into the time division color signal of serial form.

A scanner 23, on the other hand, is controlled by a control circuit 27 in synchronicity with the horizontal and vertical sync signals separated from the color video format signal by a sync separating circuit 28, to deflect the light beam, in two-dimensional fashion, on the two-dimensional screen 12. The synchronization between the scanning of the light beam, which is two-dimensionally deflected by the scanner 23 on the screen surface, and the changes in the intensity and color of the light beam are attained in this way, and images are projected on the screen 12.

Thus a structure in which a light beam is used as the scanning beam is employed according to the present invention, so that use of an evacuated envelope is made unnecessary. This enables reduction the weight of the whole system considerably. Furthermore, there is an advantage that the position of the screen is adjustable in the structure according to the present invention. Therefore, the picture size can be changed with ease, so that enlargement of the picture size is readily attained.

As specifically described in the foregoing, in the beam-index color display unit according to the present invention, a two-dimensional screen consisting of stripes of light beam sensitive three-color light emitting elements arranged with regularity in a predetermined direction is scanned by a single light beam in synchronism with horizontal and vertical sync signals separated from a color video format signal. At the same time the light beam is sensed by a plurality of light sensing devices, of stripe form each of which is disposed between adjacent stripes of R, G, B three-color light emitting elements, and the intensity of the light beam is modulated in response to the information signal in the color video format signal, in synchronicity with the timing of scanning of the light beam in the predetermined direction which is derived by using sensing outputs obtained by the sensing of the light beam.

By the above-described structure according to the present invention, an evacuated envelope is made unnecessary, so that the whole system can be made lightweight. Furthermore, the picture size can be changed easily, so that a display unit having a large picture size can be constructed easily.

What is claimed is:

1. A beam-index color display unit comprising:
   a two-dimensional screen consisting of stripes of light beam sensitive three-color light emitting elements arranged with regularity in a predetermined direction;
   light beam scanning means for scanning said two-dimensional screen by a single light beam in synchronism with horizontal and vertical sync signals separated from a color video format signal;
   a plurality of light sensing means for receiving said light beam, each of said plurality of light sensing means comprising a stripe of photoelectric material disposed between adjacent stripes of light beam sensitive three-color light emitting elements, each stripe being responsive to said light beam to generate an output signal;
   a plurality of signal lines, each connected to a respective one of said stripes of photoelectric material;
   position detection means connected to said plurality of signal lines for controlling said light beam scanning means on the basis of the output signals generated by said light sensing means; and
   light modulating means for modulating the intensity of said light beam by information signals contained in said color video format signals in synchronism with a timing of scanning in said predetermined direction which is derived by using sensing outputs from said plurality of light sensing means.

* * * * *